(12) United States Patent
Lee et al.

(10) Patent No.: US 9,483,259 B1
(45) Date of Patent: Nov. 1, 2016

(54) SYSTEM AND METHOD FOR PROVIDING REAL-TIME EXECUTION OF SOURCE CODE IN A COLLABORATIVE ONLINE SOFTWARE DEVELOPMENT ENVIRONMENT

(71) Applicant: Google Inc., Mountain View, CA (US)

(72) Inventors: Jacob E. Lee, Brooklyn, NY (US);
Azmat Ali Pasha, Chicago, IL (US);
Jon Eric Trowbridge, Paris (FR);
Benjamin M. Collins-Sussman, Chicago, IL (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/827,381

(22) Filed: Mar. 14, 2013

Related U.S. Application Data

(60) Provisional application No. 61/643,528, filed on May 7, 2012, provisional application No. 61/643,645, filed on May 7, 2012, provisional application No. 61/643,563, filed on May 7, 2012.

(51) Int. Cl.
*G06F 9/44* (2006.01)

(52) U.S. Cl.
CPC .. *G06F 8/71* (2013.01); *G06F 8/30* (2013.01)

(58) Field of Classification Search
CPC .............. G06F 8/71; G06F 8/30; G06F 8/20; G06F 8/10
USPC ................................ 717/101, 102, 103, 110
See application file for complete search history.

(56) References Cited

U.S. PATENT DOCUMENTS

| | | | |
|---|---|---|---|
| 7,000,220 B1 * | 2/2006 | Booth ........................... | 717/110 |
| 8,656,343 B2 * | 2/2014 | Fox et al. ....................... | 717/101 |
| 2012/0284684 A1 * | 11/2012 | Michaely et al. ............. | 717/103 |
| 2013/0282798 A1 * | 10/2013 | McCarthy et al. ........... | 709/203 |

OTHER PUBLICATIONS

Jim Whitehead, Collaboration in Software Engineering: A Road Map, Future of Software Engineering, 2007.*

* cited by examiner

*Primary Examiner* — Anna Deng
(74) *Attorney, Agent, or Firm* — Lerner, David, Littenberg, Krumholz & Mentlik, LLP

(57) ABSTRACT

Access to a source code file stored at a server is provided to a plurality of user devices, via a network. The source code file may comprise software code. The source code file stored at the server is updated based on a plurality of changes received from respective user devices, substantially in real-time. A selection of an option to execute the source code file is received from one of the plurality of user devices. In response to the selection, the source code file is executed, substantially in real-time.

19 Claims, 13 Drawing Sheets

| | Activity Identifier (434) | Developer Name (436) | Activity Information (438) |
|---|---|---|---|
| 451 | MM/DD/YYYY 12:01:01 | Developer 1 | Activity 1 |
| 452 | MM/DD/YYYY 12:03:05 | Developer 2 | Activity 2 |

SYSTEM AND METHOD FOR PROVIDING REAL-TIME EXECUTION OF SOURCE CODE IN A COLLABORATIVE ONLINE SOFTWARE DEVELOPMENT ENVIRONMENT

This application claims the benefit of U.S. Provisional Patent Application No. 61/643,528, filed on May 7, 2012, U.S. Provisional Patent Application No. 61/643,645, filed on May 7, 2012, and U.S. Provisional Patent Application No. 61/643,563, filed on May 7, 2012, each of which is incorporated by reference herein in its entirety.

TECHNICAL FIELD

This specification relates generally to systems and methods for providing software development processing services, and more particularly to systems and methods for facilitating collaborative online software development.

BACKGROUND

Existing online software development services allow a developer to create and edit a source code file via the Internet, and store the source code at a remote location. Typically, a developer may access an online software development service using a web browser operating on a computer or other device. By storing the source code at the remote location, a developer can access the source code from any location, using a computer or other device that has access to the Internet. While existing software development services enable a single developer to access and edit a source code file remotely, these services offer limited collaboration capabilities.

SUMMARY

In accordance with an embodiment, a method for providing software development services is provided. Access to a source code file stored at a server is provided to a plurality of user devices, via a network. Respective changes to the source code file are received from the plurality of user devices. One or more operational transformation rules are applied to the respective changes, generating a plurality of modifications applicable to the source code file. A subset of modifications applicable to respective portions of the source code file stored in respective user devices, the respective portions being less than the source code file, are determined. Each of the transformed changes is transmitted only to one or more user devices that store a portion of the source code file corresponding to the respective modification.

In accordance with an embodiment, a first change to the source code file is received from a first user device, and a second change to the source code file is received from a second user device.

In accordance with an embodiment, a determination is made that a first user device stores a first predetermined number of pages of the source code file, and first selected pages equal in number to the first predetermined number of pages are transmitted to the first user device. A determination is made that a second user device stores a second predetermined number of pages of the source code file, and second selected pages equal in number to the second predetermined number of pages are transmitted to the second user device.

In accordance with another embodiment, a first modification is determined from among the plurality of modifications that is relevant to the first selected pages, and the first modification is transmitted to the first user device. A second modification is determined from among the plurality of modifications that is relevant to the second selected pages, and the second modification is transmitted to the second user device.

In another embodiment, the first one of the respective changes applies to one of the first selected pages. The one of the respective changes may apply to a location in the source code file located before the first selected pages, and cause a resulting modification applicable to the one of the first selected pages.

In another embodiment, the first user device stores a first predetermined number of pages determined based on a predetermined number of lines of source code.

In accordance with another embodiment, a method of providing software development services is provided. Access to a source code file stored at a server is provided to a plurality of user devices, via a network. The source code file stored at the server is updated based on a plurality of changes received from respective user devices, substantially in real-time. A selection of an option to execute the source code file is received from one of the plurality of user devices. In response to the selection, the source code file is executed, substantially in real-time.

In one embodiment, the source code file comprises a plurality of files. The source code file may comprise software code. A plurality of users employing the plurality of user devices are allowed to collaboratively edit the software code.

In another embodiment, substantially simultaneous access to a source code file stored at a server is provided to a plurality of user devices, via a network. A request to perform a service with respect to the source code file is received from one of the plurality of user devices, and in response to the request, the service is performed with respect to the source code file, substantially in real-time. The service may comprise one of a compiler service and a code analysis service.

In another embodiment, the source code file is modified based on a change received from a first user device, generating a modified source code file. A second request that a particular user review the modified source code file is received from the first user device. In response to the second request, a review request is transmitted to the particular user. A second selection of the option to execute the modified source code file is received from the particular user, and in response to the second selection, the modified source code file is executed substantially in real-time.

In another embodiment, a request to generate a branch of the source code file is received from a first user device. In response to the request, a branch of the source code file is generated. The branch is modified based on a change received from the first user device. A second request that a particular user review the branch is received from the first user device. In response to the second request, a review request is transmitted to the particular user. A second selection of a second option to execute the branch is received from the particular user, and in response to the second selection, the branch is executed, substantially in real-time.

In another embodiment, updating the source code file comprises identifying a plurality of updates to the source code file. A local portion of the source code file stored by a user device is determined, the portion being less than all of the source code file. For each update within the plurality of updates, the respective update is transmitted to the user device only if the respective update corresponds to the local portion of the source code file.

In accordance with another embodiment, access to a source code file stored at a server is provided to a device, the access being provided via an Internet. In response to a request from the device, a branch is generated based on the source code file. The branch is updated based on a change received from the device, generating an updated branch. A conflict is detected between the updated branch and the source code file, and a user is notified of the device of the conflict.

In one embodiment, the source code file comprises a first plurality of files, and the branch comprises a second plurality of files.

In another embodiment, in response to a selection of a merge option, the updated branch and the source code file are merged.

In another embodiment, the branch is updated based on the change received from the device, substantially in real-time. A selection of an option to execute the updated branch is received from the device, and, in response to the selection, the updated branch is executed, substantially in real-time.

In another embodiment, a background routine monitors the source code file and the branch to identify conflicts between the source code file and the branch. It may be detected that a second device has accessed the source code file and that the source code file has been modified based on a second change received from the second device, generating a modified source code file. It may be further detected that a second conflict exists between the updated branch and the modified source code file. In response, the user is notified of the second conflict.

In other embodiments systems, apparatus, and devices for performing the methods described above are provided. In other embodiments, computer readable media storing computer program instructions, which, when executed by a processor, cause the processor to perform operations described herein, are provided.

These and other advantages of the present disclosure will be apparent to those of ordinary skill in the art by reference to the following Detailed Description and the accompanying drawings.

BRIEF DESCRIPTION OF THE DRAWINGS

FIG. 11C shows an activity table in accordance with an embodiment;

DETAILED DESCRIPTION

Figure 1:
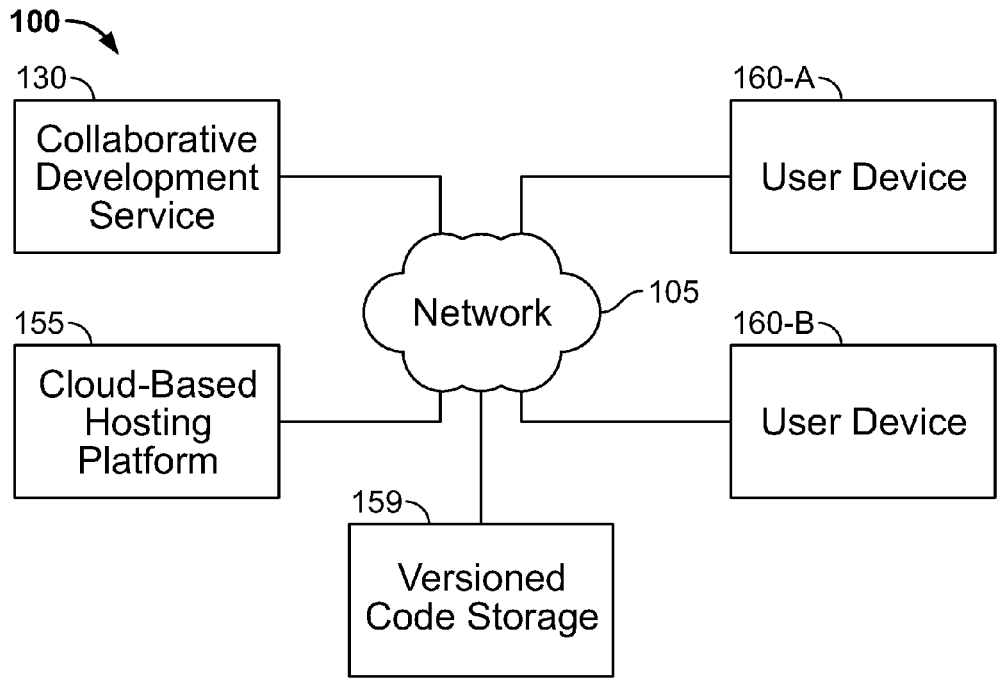
FIG. 1 shows a communication system that may be used to provide collaborative development services in accordance with an embodiment.

FIG. 1 shows a communication system 100 that may be used to provide collaborative software development services in accordance with an embodiment. Communication system 100 includes a network 105, a collaborative development service 130, a cloud-based hosting platform 155, a versioned code storage 159, and a plurality of user devices 160-A, 160-B, etc. For convenience, the term "user device 160" is used herein to refer to any one of user devices 160-A, 160-B, etc. Accordingly, any discussion herein referring to "user device 160" is equally applicable to each of user devices 160-A, 160-B, etc. Communication system 100 may include more or fewer than two user devices.

In the exemplary embodiment of FIG. 1, network 105 is the Internet. In other embodiments, network 105 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may include a combination of different types of networks.

Collaborative development service 130 provides a platform and software development services to software developers, enabling developers to create, display, edit, operate, and deploy a variety of software applications. For example, one or more developers may access collaborative development service 130 via network 105, create a source code file containing software code, and collaboratively edit the code. Multiple developers may access the source code file simultaneously, and each may separately make his or her own edits to the code, for example.

While the systems and methods described herein are discussed with reference to a single source code file, it is to be understood that the use of the systems and methods described herein is not limited to a single source code file. In other embodiments, systems and methods described herein may be used by software developers while collaborating to create and edit multiple source code files. The discussion herein also describes the creation of a "branch" based on a source code file. A branch that includes a single file may be created based on a single source code file. Alternatively, a branch that includes multiple files may be created based on a plurality of source code files. Systems and methods described herein may be used with respect to one or more branches derived from one or more source code files.

In one embodiment, collaborative development service 130 may be accessible via a World Wide Web page that may be viewed using a conventional Web browser, for example. In another embodiment, collaborative development service 130 may be accessed via an installed application residing on a user device. A developer may be required to log into a respective account to access a source code file or other document. Collaborative development service 130 may grant to a developer access rights with respect to a source code file or document, such as viewing and/or editing rights.

In other embodiments, a client application may be installed on a user device to handle periods of network unavailability, to enable a user to continue editing while offline. Such functionality may alternatively be incorporated into the browser of a user device.

User device 160 may be any device that enables a developer to communicate via network 105. User device 160 may be connected to network 105 through a direct (wired) link, or wirelessly. User device 160 may have a display screen (not shown) for displaying information. For example, user device 160 may be a personal computer, a laptop computer, a workstation, a mainframe computer, etc. Alternatively, user device 160 may be a mobile communication device such as a wireless phone, a personal digital assistant, a tablet device, etc. Other devices may be used.

Figure 2:
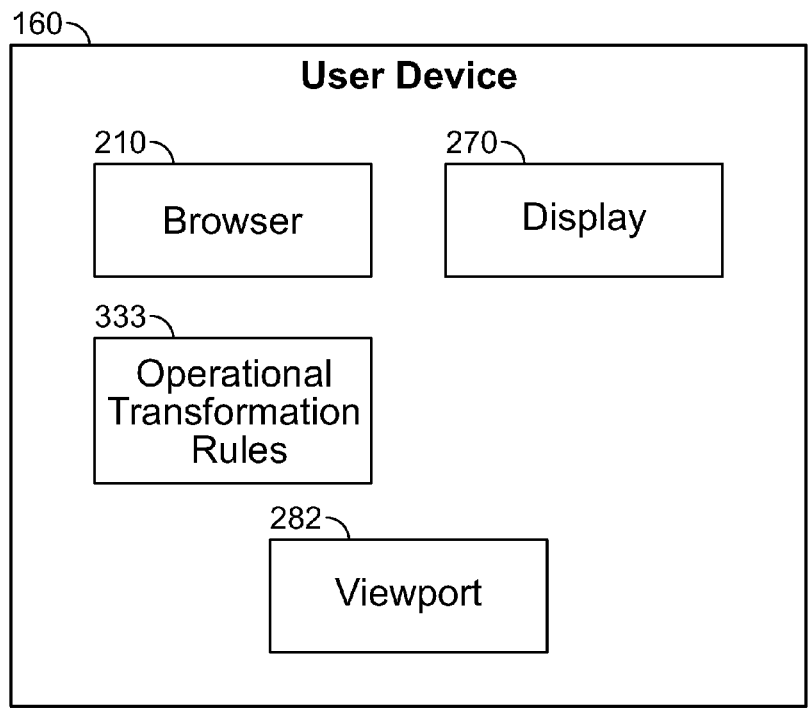
FIG. 2 shows functional components of an exemplary user device in accordance with an embodiment.

FIG. 2 shows functional components of an exemplary user device 160 in accordance with an embodiment. User device 160 includes a web browser 210 and a display 270. Web browser 210 may be a conventional web browser used to access World Wide Web sites via the Internet, for example. Display 270 displays source code files, documents, images, Web pages, and other information. For example, all or a portion of a source code file or other document that a developer creates or edits may be displayed on display 270.

User device 160 also includes a viewport 282, which holds a portion of a source code file. In some embodiments, viewport 282 has a predetermined size and therefore may store a quantity of data equal to or less than the predetermined size. The size of a user device's viewport may depend on the device type. For example, a laptop computer may have a viewport that holds the equivalent of five pages of text data, a workstation may have a viewport that holds up to ten pages of text data, a cell phone may have a viewport that holds the equivalent of seven display screens of text data, etc.

A set of operational transformation rules 333 is stored in user device 160. Operational transformation rules 333 are discussed in more detail below.

Figure 3:
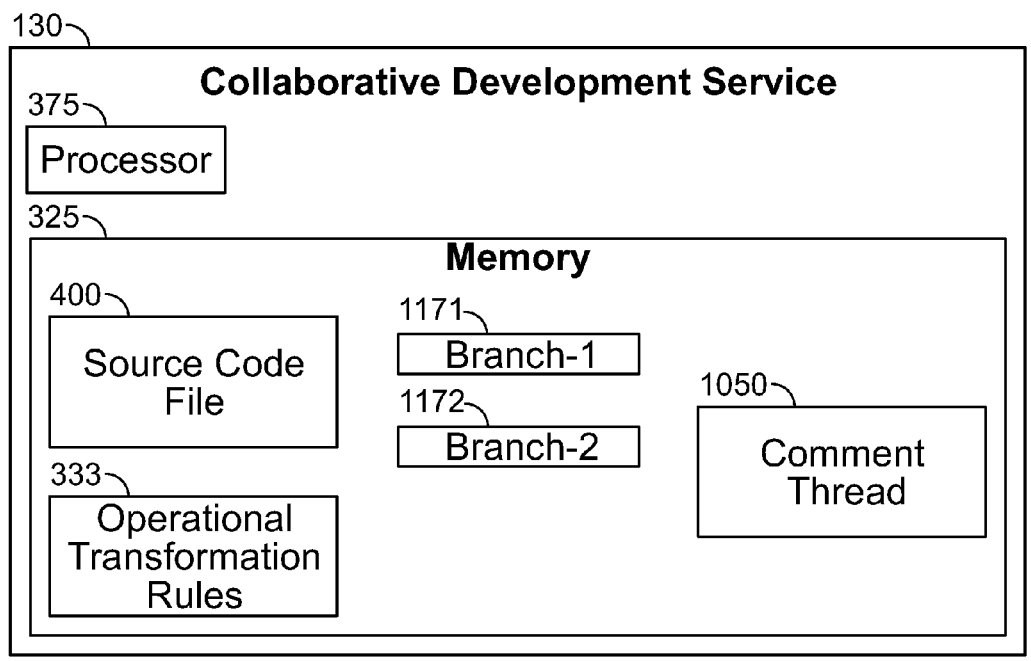
FIG. 3 shows functional components of a collaborative development service in accordance with an embodiment.

FIG. 3 shows functional components of collaborative development service 130 in accordance with an embodiment. Collaborative development service 130 includes a processor 375 and a memory 325. Collaborative development service 130 may include other components not shown in FIG. 3. Operational transformation rules 333 are stored in memory 325 (of collaborative development service 130) as well as in user device 160.

In accordance with an embodiment, a software developer employing user device 160 or other processing device may access collaborative development service 130 via network 105 and create a source code file containing software code. For example, a developer may access collaborative development service 130, write one or more lines of software code, and store the code in a source code file, such as source code file 400 shown in FIG. 4. Source code file 400 includes lines of code 404 and 406, for example. Source code file 400 may include any number of pages of code. In accordance with an embodiment, multiple software developers may access source code file 400 and edit the document simultaneously.

Figure 4:
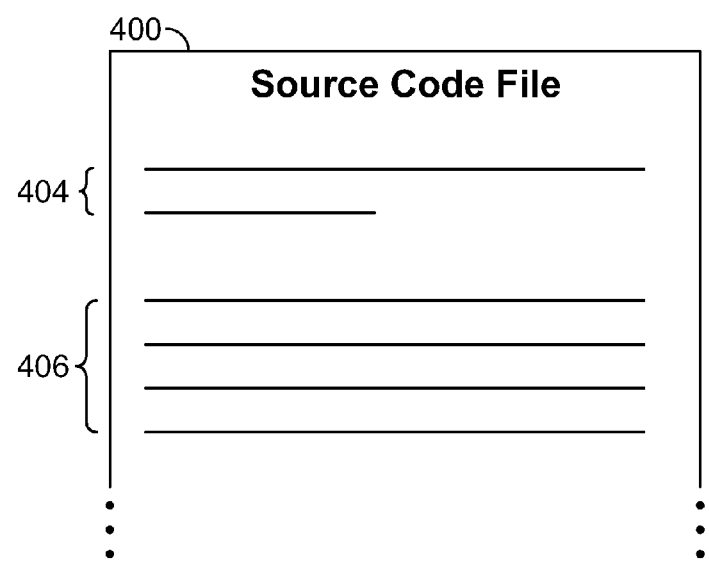
FIG. 4 shows a source code file in accordance with an embodiment.

It is to be understood that while FIG. 4 depicts a single source code file 400, in another embodiment, source code file 400 may represent a plurality of source code files, including one or more branches of these files. In some embodiments source code file 400 may comprise hundreds or thousands of different source code files related to a project, product, etc.

Operational Transformations

In accordance with an embodiment, collaborative development service 130 may receive, substantially simultaneously, from a plurality of user devices, multiple instructions specifying respective changes to a source code file. In response, collaborative development service 130 uses operational transformation rules 333 to determine a transformed instruction, or set of transformed instructions, to cause the user devices to display the changed software code accurately and consistently, and transmits the transformed instruction(s) to the respective user devices.

Referring again to FIG. 3, operational transformation rules 333 include rules governing the modification of data in a source code file, and the display of a source code file on multiple user devices, when multiple changes are made to the source code file. In one embodiment, operational transformation rules 333 resolve conflicting changes specified in a plurality of instructions received from a plurality of user devices. When a plurality of instructions received from a plurality of user devices specify conflicting changes to a source code file that may create inconsistent representations of the source code file across the respective user devices, one or more operational transformations are applied to generate one or more transformed operations operable to reflect the specified changes in a consistent manner in the representations displayed on the respective devices. In particular, the rules apply a logic that contextualizes the changes specified by multiple instructions to determine a resolution that will result in a consistent representation of a source code file across multiple devices and within collaborative development service 130, without creating a collision (such as a temporal paradox or a race condition). In one embodiment, operational transformations are applied to instructions received from user devices in real-time or substantially in real-time, to enable the respective user devices to update the respective representations of the source code file in real-time or substantially in real-time. A transformed operation may, or may not, include a modification to the source code file.

Referring to FIG. 3, processor 375 examines instructions received from respective user devices 160 and selectively applies operational transformation rules 333 to determine transformed operations. In an embodiment, processor 375, in accordance with operational transformation rules 333, examines a first instruction P specifying a first change to a source code file, and a second instruction Q specifying a second change to the source code file, and determines a set of transformed operations (P',Q') in accordance with the following transformation rule:

$$T(P,Q) \rightarrow P',Q' \text{ such that } P*Q'==Q*P' \qquad \text{(Rule 1)}$$

In accordance with Transformation Rule 1, a first transformed operation and a second transformed operation are determined such that application of the first transformed operation to the source code file followed by application of a second transformed operation produces a result that is the same as the result of application of the second transformed operation followed by application of the first transformed operation. The application of Transformation Rule 1 is further described in the illustrative embodiments discussed below.

Suppose, for purposes of illustration, that a first developer employing user device 160-A, uses collaborative development service 130 to access source code file 400. A second developer employing user device 160-B, simultaneously accesses source code file 400 in the same manner. Suppose that a first instruction is received from a first device to insert text of length X at the beginning of a word of length Y, and a second instruction is received from a second device to insert text at the end of the word (after the Yth alphanumeric character), before any request has been transmitted to update the visual representation of the word based on the first instruction. Processor 375, using operational transformation rules 333, transforms the two changes to a pair of transformed operations: a first transformed operation to insert the first text at the beginning of the word, and a second transformed operation to insert the second text after the (X+Y)th alphanumeric character of the word. Requests to perform the transformed operations are transmitted to both devices.

In another example, a first developer, employing user device 160-A may add a new line to the first page of a source code file, causing all subsequent text to be pushed down. A second developer, employing user device 160-B, may simultaneously make a change to a line on the tenth page of the source code file. Processor 375 determines that in this instance, application of the first change to the source code file followed by application of the second change produces a result that is different from application of the second change followed by application of the first change (because the text on the tenth page is pushed down by the first developer's change). Accordingly, processor 375 uses operational transformation rules 333 to transform the two changes to a pair of transformed operations in accordance with Transformation Rule 1, and transmits one or more of the transformed operations to each of the two user devices.

In accordance with an embodiment, each user device 160 does not store all of source code file 400 but instead stores only a portion of source code file 400. In particular, each user device 160 stores a portion of source code file 400 corresponding to the size of its viewport 282.

Figure 5:
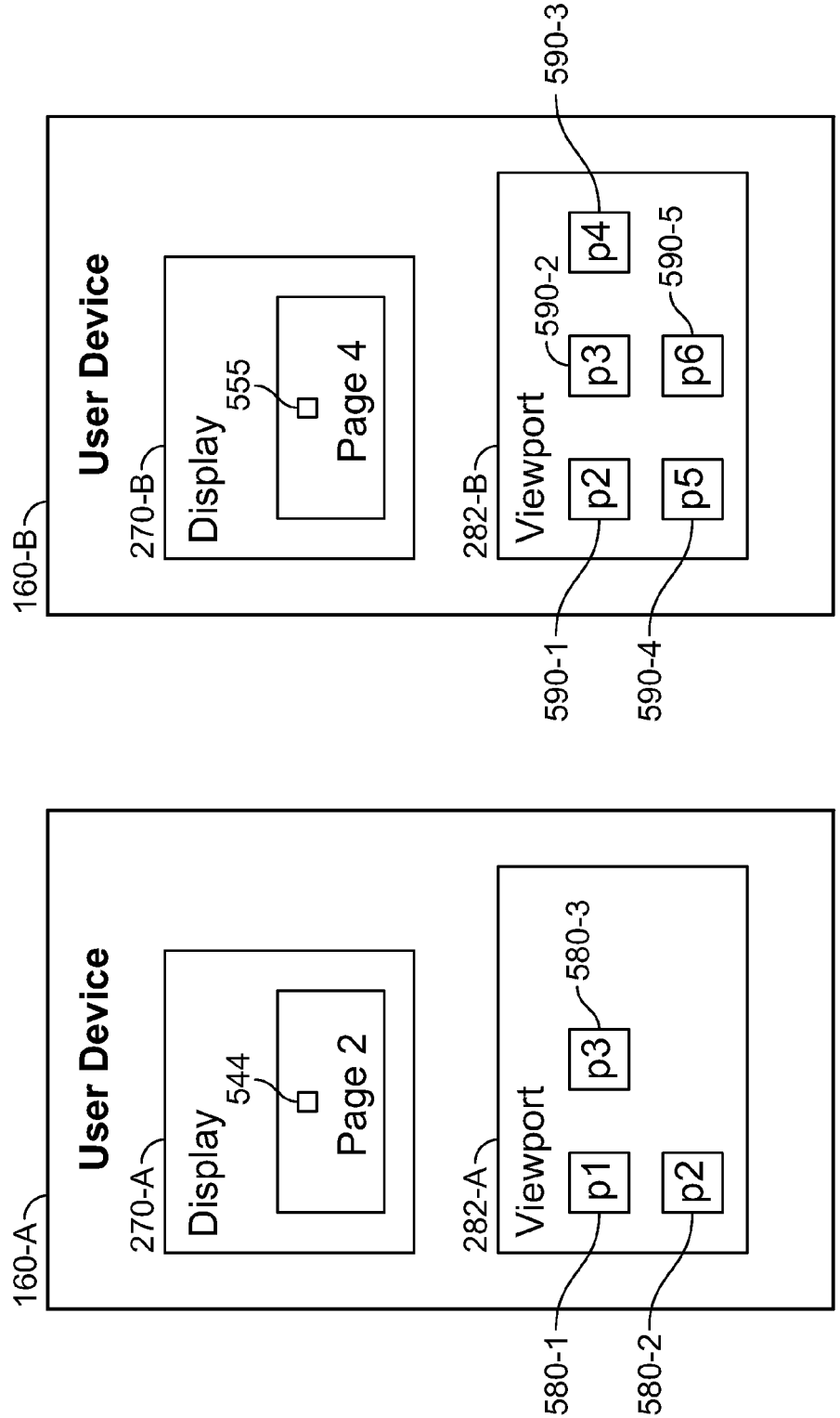
FIG. 5A shows a display and a viewport of a user device in accordance with an embodiment.
FIG. 5B shows a display and a viewport of a user device in accordance with an embodiment.

In an illustrative embodiment shown in FIGS. 5A-5B, each user device 160 stores a portion of source code file 400 equivalent to N pages of source code file 400, where N is an integer determined based on the size of the user device's viewport. In this example, viewport 282-A of user device 160-A may store data equivalent to three pages 580-1, 580-2, 580-3 of source code file 400, while viewport 282-B of user device 160-B may store data equivalent to five pages 590-1, 590-2, 590-3, 590-4, 590-5 of source code file 400. In other embodiments, a viewport may have a different size.

In other embodiments, the size of a viewport in a user device may be based another measure, such as a predetermined number of lines of source code. Other measures may be used.

Accordingly, collaborative development service 130 may monitor the activities of the developer employing user device 160-A and from time to time transmit to user device 160-A a portion of source code file 400 having a size suitable to the device's viewport and determined based on the location within the source code file that the developer is currently viewing. The portion of the source code file transmitted to a particular user device is determined based on the size of the viewport of particular user device. For example, because viewport 282-A of user device 160-A has a size equivalent to three pages of source code file 400, collaborative development service 130 may from time to time transmit to user device 160-A a portion that includes the page of the source code file that the developer is currently viewing, a page immediately prior to the page that the developer is currently viewing and a page immediately following the page that the developer is currently viewing. Supposing, for example, that a first developer employing user device 160-A is currently viewing the second page of document 400, viewport 282-A of user device 160-A accordingly stores data corresponding to page 1, page 2, and page 3 of document 400, as shown in FIG. 5A.

Collaborative development service 130 may similarly monitor the activities of the developer employing user device 160-B and from time to time transmit to user device 160-B a portion of source code file 400 including the page that the developer is currently viewing, the two pages preceding the current page, and the two pages immediately following the current page. Supposing, for example, that a second developer employing user device 160-B is currently viewing the fourth page of source code file 400, viewport 282-B accordingly stores data corresponding to page 2, page 3, page 4, page 5, and page 6 of source code file 400, a shown in FIG. 5B.

Suppose now that the first developer makes a change 544 to the second page and that, substantially simultaneously, the second developer makes a change 555 to the fourth page of the source code file. In accordance with another embodiment, collaborative development service 130 transmits a transformed operation to a particular user device only if the transformed operation pertains to the portion of a source code file that is currently stored in the user device's viewport.

Figure 6:
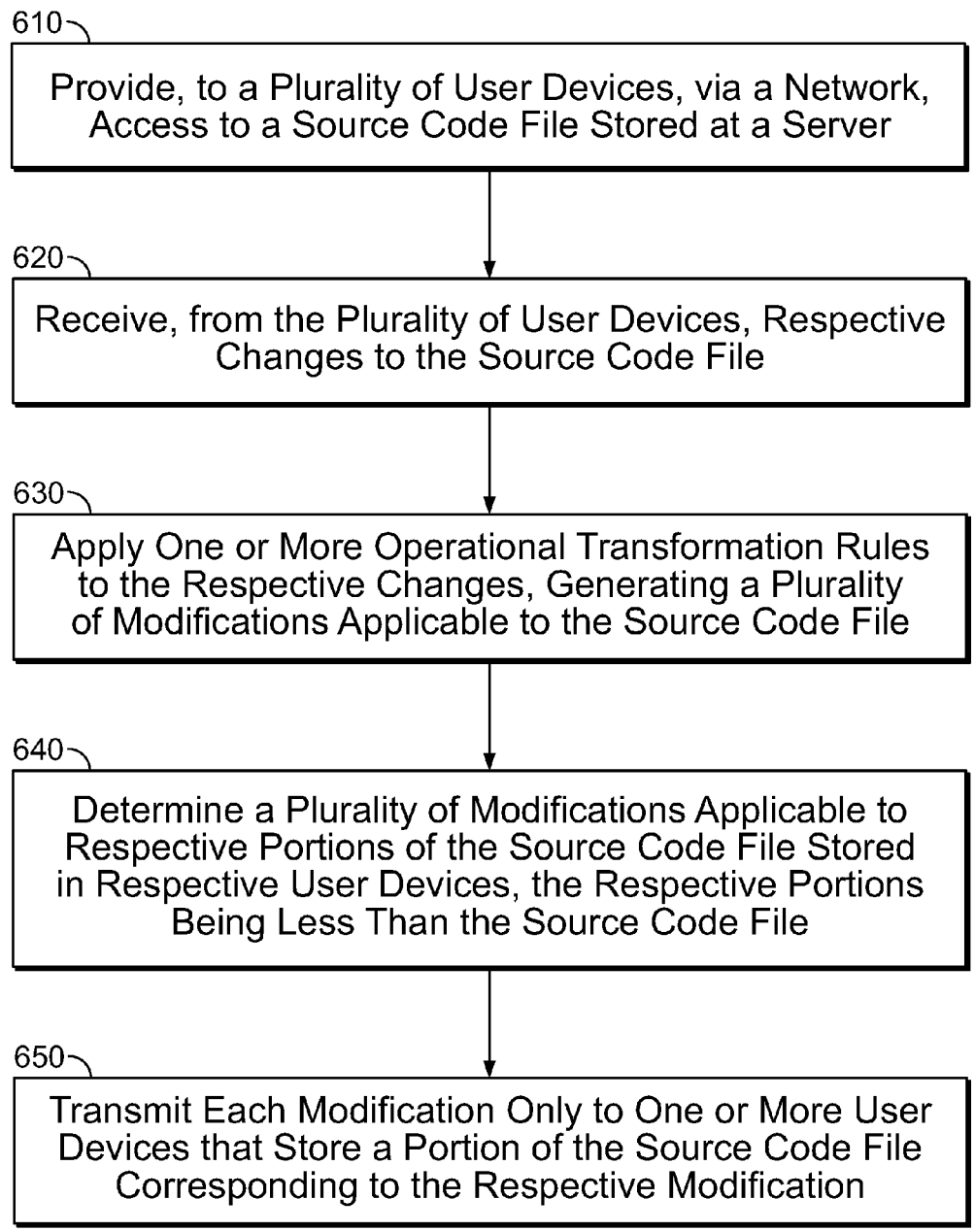
FIG. 6 is a flowchart of a method of providing collaborative development services in accordance with an embodiment.

FIG. 6 is a flowchart of a method of providing collaborative development services in accordance with an embodiment. At step 610, access to a source code file stored at a server is provided to a plurality of user devices, via a network. In the illustrative embodiment, access to source code file 400 is provided to the first developer employing user device 160-A and to the second developer employing user device 160-B. At step 620, respective changes to the source code file are received from the plurality of user devices. Change 544 is received from user device 160-A, and change 555 is received from user device 160-B.

At step 630, one or more operational transformation rules are applied to the respective changes, generating a plurality of modifications applicable to the source code file. In the illustrative embodiment, collaborative development service 130 receives change 544 made by the first user to the second page of document 400, and change 555 made by the second user to the fourth page of the document. Collaborative development service 130 applies appropriate operational transformation rules to the changes, and generates a first transformed change, or modification, relevant to the second page of source code file 400 and a second transformed change, or modification, relevant to the fifth page of the source code file.

At step 640, a plurality of modifications applicable to respective portions of a source code file stored in respective user devices, the respective portions being less than the source code file, are determined. In the illustrative embodiment, collaborative development service 130 determines that the first transformed change is relevant to the second page of source code file 400 and is therefore relevant both to viewport 282-A of user device 160-A and also to viewport 282-B of user device 160-B. Collaborative development service 130 determines that the second transformed change is relevant to the fourth page of source code file 400, and is therefore relevant to viewport 282-B of user device 160-B, but is not relevant to viewport 282-A of user device 160-A. In some embodiments, certain types of information related to a transformed change may be transmitted to a particular user device although the transformed change itself is not relevant to the viewport of the user device.

At step 650, each of the modifications is transmitted only to one or more user devices that store a portion of the source code file corresponding to the respective modification. Collaborative development service 130 therefore transmits the first transformed change both to user device 160-A and to user device 160-B. Collaborative development service 130 transmits the second transformed change to user device 160-B, but does not transmit the second transformed change to user device 160-A.

The methods and systems described herein advantageously allow developers who use an online software development service to collaboratively develop and edit software code in real-time. Unlike existing methods and systems, the methods and systems described herein transform changes made by multiple developers and display the changes on multiple devices in a consistent manner while avoiding collisions. Furthermore, the changes are displayed on multiple devices in real-time, allowing each developer to view not only his or her own changes to the document, but also changes made by other developers, in real-time. In addition, the use of viewports as described herein further facilitates efficient real-time collaborative development.

State of Completion

In accordance with an embodiment, collaborative development service 130 provides a state of completion service to developers. While a developer inputs source code at the developer's user device, collaborative development service 130 continually monitors and analyzes the developer's input and from time to time provides one or more completion options for completing the input. For example, if a developer types a set of characters that are less than a full line of source code, collaborative development service 130 may analyze the developer's input and offer one or more options for completing the line. Similarly, if a developer types a set of characters that are less than a full word, collaborative development service 130 may analyze the developer's input and offer one or more options for completing the word. Collaborative development service 130 analyzes a developer's input and identifies possible options for completion of an input based on common patterns, logic (only options that are logically possible are presented), etc.

Monitoring of Source Code Logic

Figure 7:
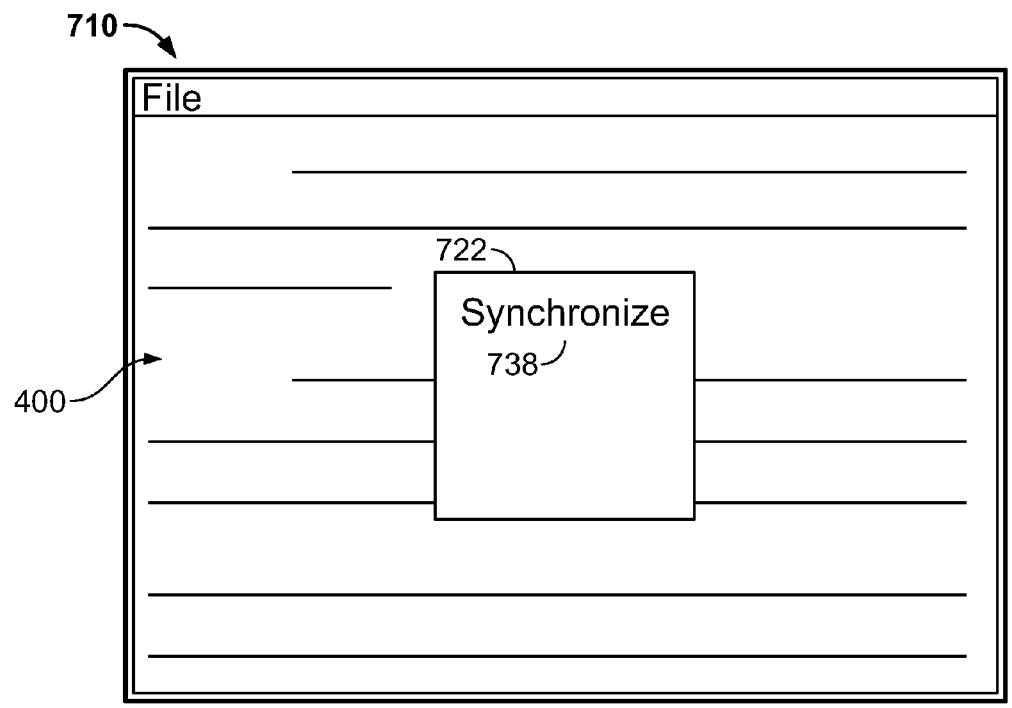
FIG. 7 shows a web page displaying a source code file and a menu with a synchronize option in accordance with an embodiment.

In accordance with an embodiment, if a first developer makes a first change to source code file 400 and a second developer makes a second change to the source code file, either developer may select a "synchronize" option to verify that his or her change does not result in a logical conflict. FIG. 7 shows a web page displaying source code file 400 that may be displayed on a user device 160 in accordance with an embodiment. If a developer employing user device 160 makes a change to source code file 400 and wishes to check whether or not the change results in a logical conflict, the developer may click a button on a computer mouse, for example, causing a menu 722 that includes a synchronize option 738 to appear. When the developer selects synchronize option 738, collaborative development service 130 analyzes the source code in source code file 400 to determine whether the developer's change to the code results in any logical conflicts. If a logical conflict is identified, a message may be transmitted to the developer indicating that the developer's change results in a logical conflict. The message may further specify a particular portion of the source code file that conflicts with the developer's change. The message may further instruct the developer to resolve the conflict, by further editing the source code, for example. In another embodiment, a synchronize option may appear automatically when any change is made to source code file 400.

In some embodiments, if multiple changes are made to a source code file substantially simultaneously, the developer who made the last change is required to select the synchronize option to resolve any conflicts associated with the change.

The synchronize functionality may be used in connection with the branching and merging functionality which is described below.

Undo

In accordance with an embodiment, a developer who has made a change to a source code file may select an undo option to reverse the change. For example, a developer may select an undo option from a drop-down menu displayed on display 270 of user device 160.

In one embodiment, each time user device 160 transmits to collaborative development service 130 an instruction to make a change to a source code file, user device 160 also stores transiently in memory a reverse instruction in a stack data structure. When the developer selects the undo option, the most recent reverse instruction is retrieved from the stack and applied to the visual representation of the source code file on the developer's particular user device. In this manner, a developer may undo his or her own most recent change without affecting changes made by other developers. In another embodiment, a developer may selectively undo a change that he or she made within a source code file (even if the change is not the most recent change made by the developer), without affecting any other change.

A redo option is also available to re-apply a change that has been reversed by the selection of the undo option.

In another embodiment, a synchronize option (performed using the synchronize option described above, for example) may also be reversed using an undo option, in order to return to a previous state.

Activity/Revision History

Figure 8:
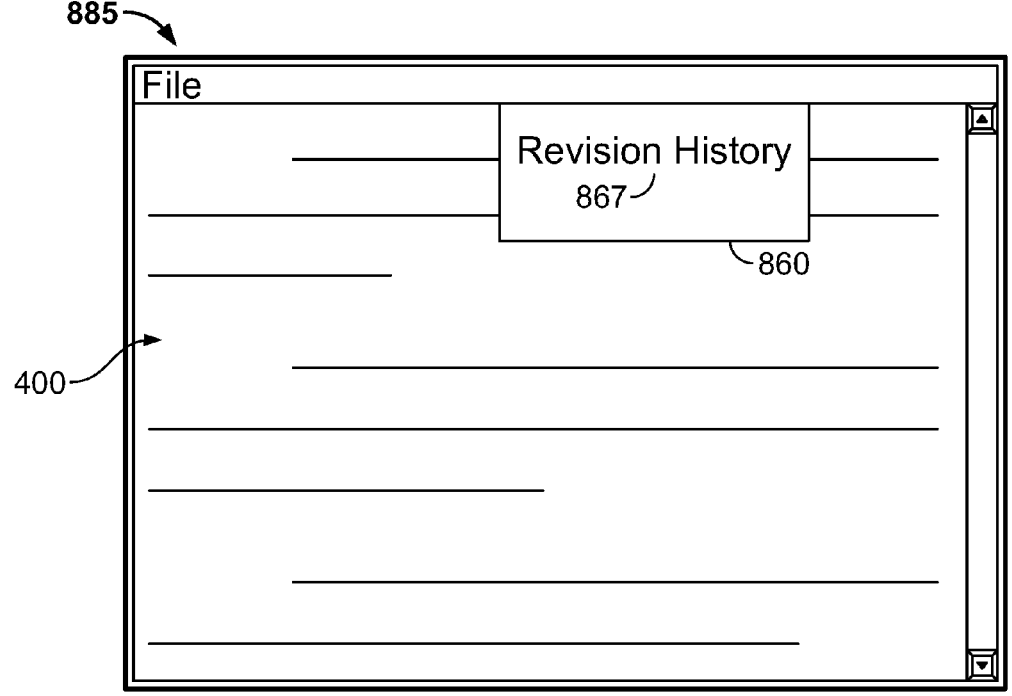
FIG. 8 shows a web page displaying a source code file and a menu with a revision history option in accordance with an embodiment.
Figure 9:
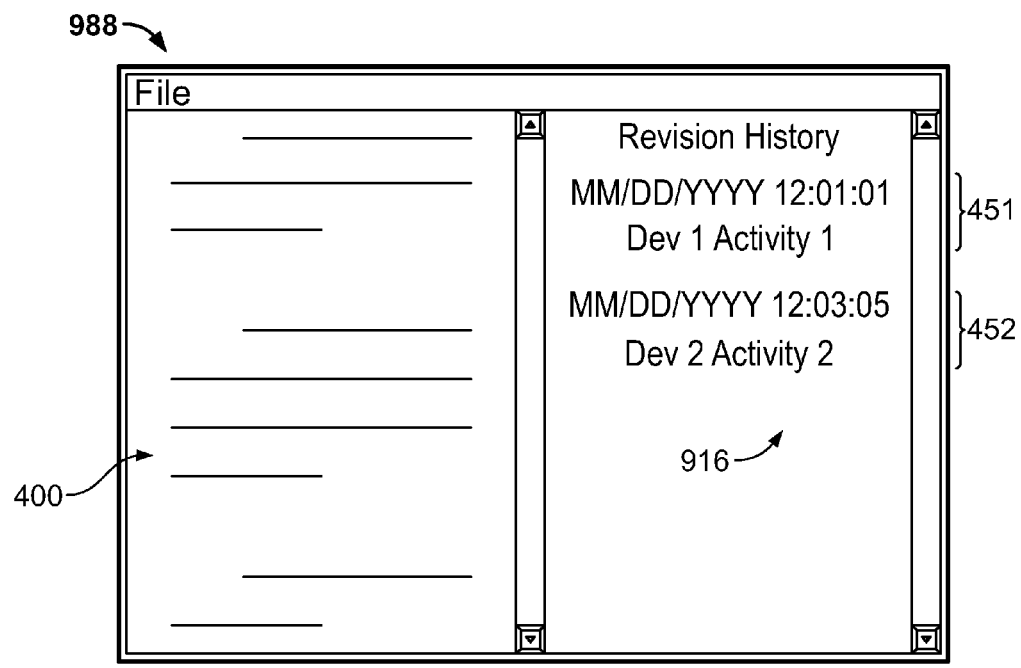
FIG. 9 shows a web page displaying a source code file and a revision history of the source code file in accordance with an embodiment.

Versioned code storage 159 keeps track of revisions to source code file 400 (and any branches thereof), and is responsible for versioning. In accordance with an embodiment, a developer viewing a source code file may view a list of revisions made to the source code file (and any branches thereof). Referring to FIG. 8, for example, a developer viewing source code file 400 on a web page 885 may press a button on a computer mouse to cause a menu 860 to appear. In this example, menu 860 includes a revision history option 867. When the developer selects revision history option 867, versioned code storage 159 accesses an activity table 428 (stored at versioned code storage 159 and illustrated in FIG. 11C) and retrieves information relating to revisions made to source code file 400 (and any branches thereof). Activity table 428 is discussed below. User device 160 displays the source code file and the source code file's revision history on a page, such as web page 988 shown in FIG. 9. A portion of source code file 400 is shown in a left-hand portion of page 988. In a right-hand portion of the page, the source code file's revision history 916 is shown. For example, the information from rows 451 and 452 of activity table 428, pertaining to the activities of Developer 1 and Developer 2, respectively, are displayed.

In another embodiment, other techniques may be used to navigate a source code file's revision history.

Comments

Figure 10:
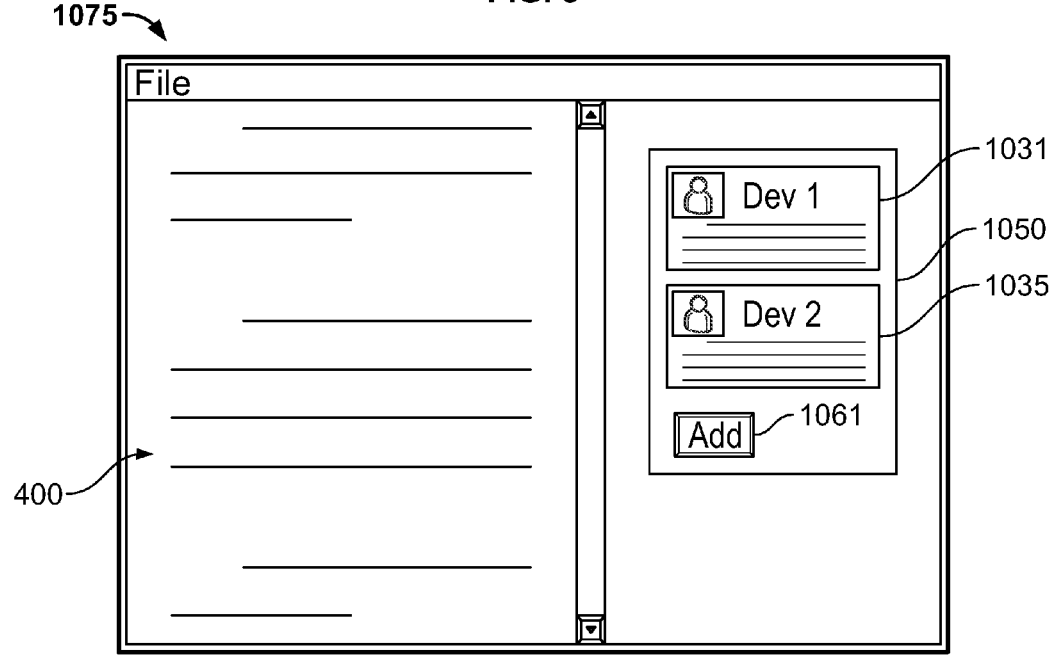
FIG. 10 shows a web page displaying a source code file and a comment thread associated with the source code file in accordance with an embodiment.

In accordance with an embodiment, collaborative development service 130 enables developers to maintain a comment thread pertaining to a source code file, while the developers are collaboratively editing the source code file. Referring to FIG. 10, a web page 1075 may be displayed on a user device 160. In this example, source code file 400 is displayed in a left-hand portion of the page. A comment thread 1050 is displayed in a right-hand portion of the page. In the illustrative embodiment, comment thread 1050 includes a first comment 1031 generated by a first developer and a second comment 1035 generated by a second developer. A developer may add a comment to the comment thread by selecting an add button 1061 and composing a comment. When a new comment is added, comment thread 1050 is updated. Comment thread 1050 is stored in memory 325, as shown in FIG. 3.

Cloud-Based Hosting Platform & Versioned Code Storage

Figure 11A:
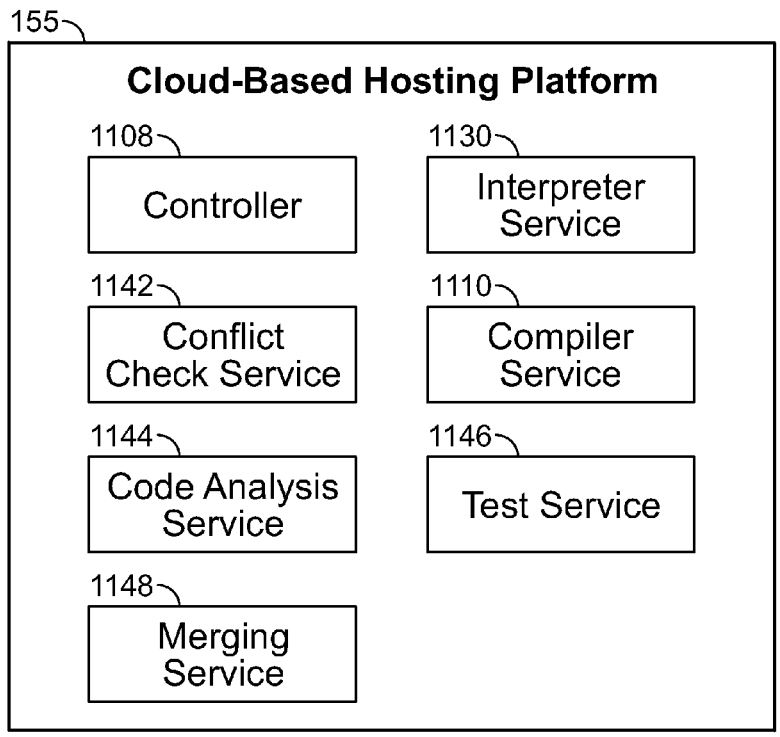
FIG. 11A shows components of an cloud-based hosting platform in accordance with an embodiment.

In accordance with an embodiment, cloud-based hosting platform 155 allows developers to compile, execute, and perform other functions with respect to a source code file upon request, substantially in real-time. FIG. 11A shows components of cloud-based hosting platform 155 in accordance with an embodiment. Cloud-based hosting platform 155 comprises a controller 1108, a compiler service 1110, an interpreter service 1130, a conflict check service 1142, a code analysis service 1144, a test service 1146, and a merging service 1148. Cloud-based hosting platform 155 may include other components not shown in FIG. 11A. Cloud-based hosting platform 155 is connected to network 105.

Any of the various services residing at cloud-based hosting platform 155 may receive a request to provide services with respect to a particular source code file, and in response, provide the requested service. For example, interpreter service 1130 may receive a request to execute a particular source code file and, in response, execute the particular source code file.

Figure 11B:
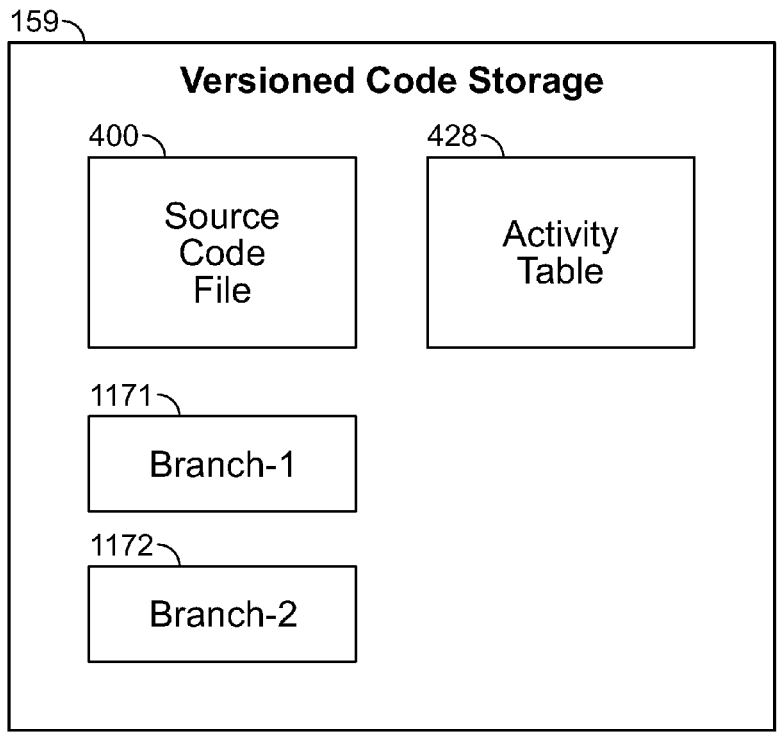
FIG. 11B shows components of a versioned code storage in accordance with an embodiment.

FIG. 11B shows components of versioned code storage 159 in accordance with an embodiment. Versioned code storage 159 may be used to store source code files and other data. Versioned code storage 159 may comprise one or more storage devices, including, without limitation, disk drives, optical disks, tape drives, etc. Versioned code storage 159 is connected to network 105.

In accordance with an embodiment, a current, up-to-date version of source code file 400 is maintained at versioned code storage 159, in addition to the version of source code file 400 maintained by collaborative development service 130. For example, when source code file 400 is created, collaborative development service 130 transmits a copy of the file to versioned code storage 159. The copy of source code file 400 is stored in versioned code storage 159, as shown in FIG. 11B. Subsequently, collaborative development service 130 from time to time transmits an updated version of source code file 400 to versioned code storage 159, where it is stored. Alternatively, collaborative development service 130 may from time to time transmit to versioned code storage 159 data indicating changes made to source code file 400.

In accordance with an embodiment, one or more developers may collaboratively edit a source code file and execute the source code substantially immediately after making the edits. Advantageously, a plurality of developers may repeatedly make edits to a source code file and, after each edit, quickly execute the source code file, for example. Because an updated version of the source code is maintained at versioned code storage 159, developers may execute the source code repeatedly and substantially in real-time.

In accordance with the illustrative embodiment of FIG. 11B, versioned code storage 159 also comprises an activity table 428. Versioned code storage 159 uses activity table 428 to maintain a record of all activities and revisions related to source code file 400, and any branches thereof, and enables developers to view activity and/or revision history pertaining to the particular source code file and any branches thereof. FIG. 11C shows activity table 428 that is associated with source code file 400 in accordance with an embodiment. Activity table 428 includes a column 434, which stores an activity identifier that identifies an activity performed by a developer, such as accessing or leaving a source code file, or making a revision to the source code file. For example, an activity identifier may include, without limitation, a data and time when the activity was performed, a counter, etc. Activity table 428 includes a column 436 identifying the developer who performed the activity. Column 438 describes the activity performed by the developer, such as entering or leaving a source code file (or a branch), or making a change to the source code file. If a developer makes a change to a source code file, the location and nature of the change may be specified in column 438. In the illustrative embodiment, activities are identified by date and time. For example, row 451 indicates that Developer 1 performed a first activity, Activity 1, at MM/DD/YYYY at 12:01:01. Row 452 contains data related to a second activity performed by Developer 2 at MM/DD/YYYY at 12:03:05. In this example, activity table 428 is stored in memory 325, as shown in FIG. 3. Activity table 428 may include other types of columns, and other types of information relating to a source code file, that are not shown in FIG. 11C.

Figure 12:
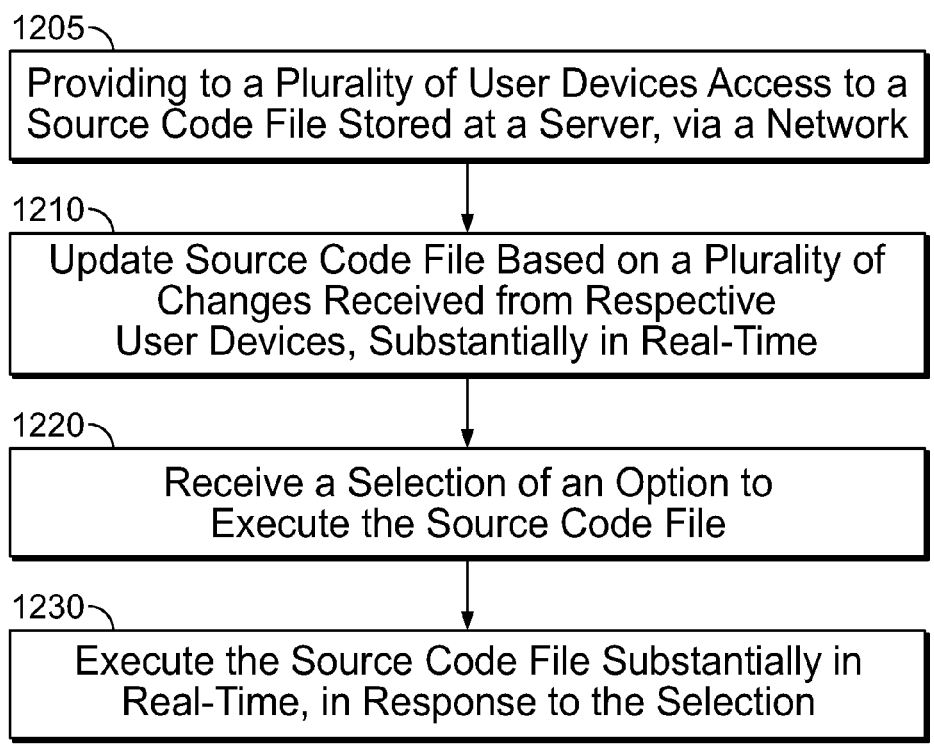
FIG. 12 is a flowchart of a method of providing collaborative software development services in accordance with an embodiment.

FIG. 12 is a flowchart of a method of providing software development services in accordance with an embodiment. At step 1205, access to a source code file stored at a server is provided to a plurality of user devices, via a network. As discussed above, access to source code file 400 may be provided to a user employing user device 160-A and simultaneously to a user employing user device 160-B. A first change to source code file 400 is received from user device 160-A, and a second change to source code file 400 is received from user device 160-B. One or more operational transformation rules are applied to the first and second changes to generate a first transformed change and a second transformed change.

At step 1210, a source code file is updated based on a plurality of changes received from respective user devices, substantially in real-time. In the illustrative embodiment discussed above, when the first transformed change and the second transformed change are determined, collaborative development service 130 transmits data indicating the first transformed change and the second transformed change to versioned code storage 159. Alternatively, the entire updated source code file may be transmitted. Versioned code storage 159 updates source code file 400 based on the first and second transformed changes.

Figure 13:
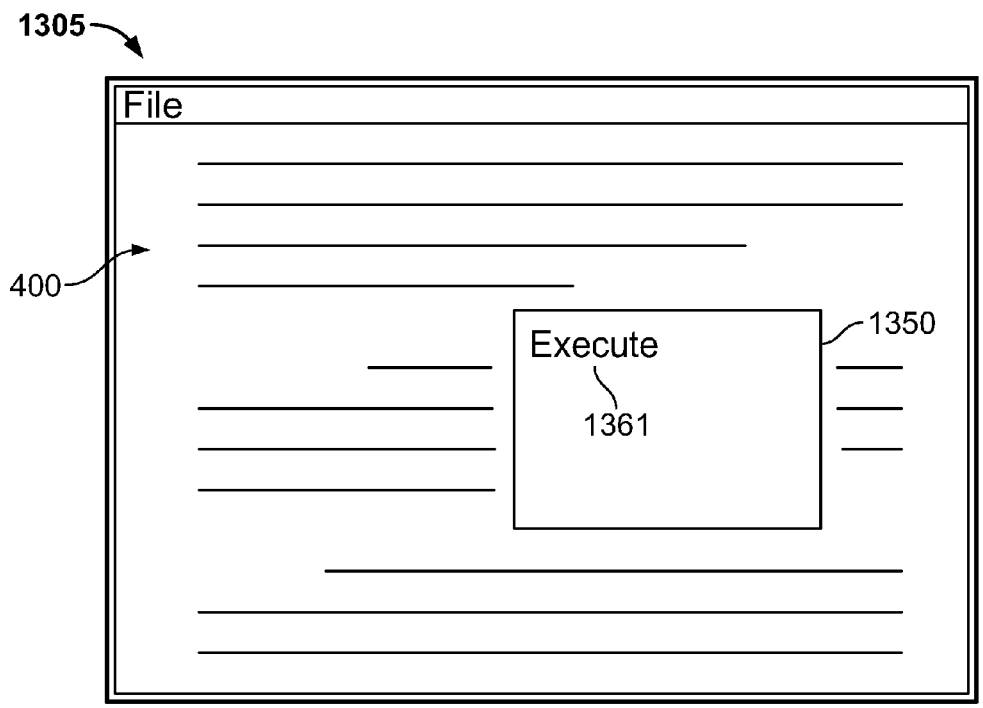
FIG. 13 shows a web page displaying a source code file and a menu with an execute option in accordance with an embodiment.

In accordance with an embodiment, developers may execute the source code upon request. For example, a developer may request execution of a source code file by selecting an option displayed on a user device. In an exemplary embodiment shown in FIG. 13, an option to execute a source code file may be presented to a user as a menu option. In this example, a developer accesses source code file 400 via a web page 1305, and causes a menu 1350 to be displayed, by clicking a button on a computer mouse, for example. Menu 1350 includes an execute option 1361. When the developer selects execute option 1361, user device 160 transmits the developer's selection to collaborative development service 130.

At step 1220, a selection of an option to execute the source code file is received. Collaborative development service 130 receives the developer's selection and forwards the selection to cloud-based hosting platform 155. Cloud-based hosting platform 155 receives the selection. At step 1230, the source code file is executed substantially in real-time, in response to the selection. In response to the user's selection of execute option 1361, cloud-based hosting platform 155 causes interpreter 1130 to execute source code file 400. In response, interpreter 1130 accesses the version of source code file 400 maintained at versioned code storage 159, and executes the source code file.

In another embodiment, an interpreter application similar to interpreter 1130 may reside and execute at collaborative development service 130 as well as at cloud-based hosting platform 155. In this embodiment, when collaborative development service 130 receives a developer's selection of execute option 1361, collaborative development service 130 causes the interpreter application residing at collaborative development service 130 to execute the source code file.

Figure 14:
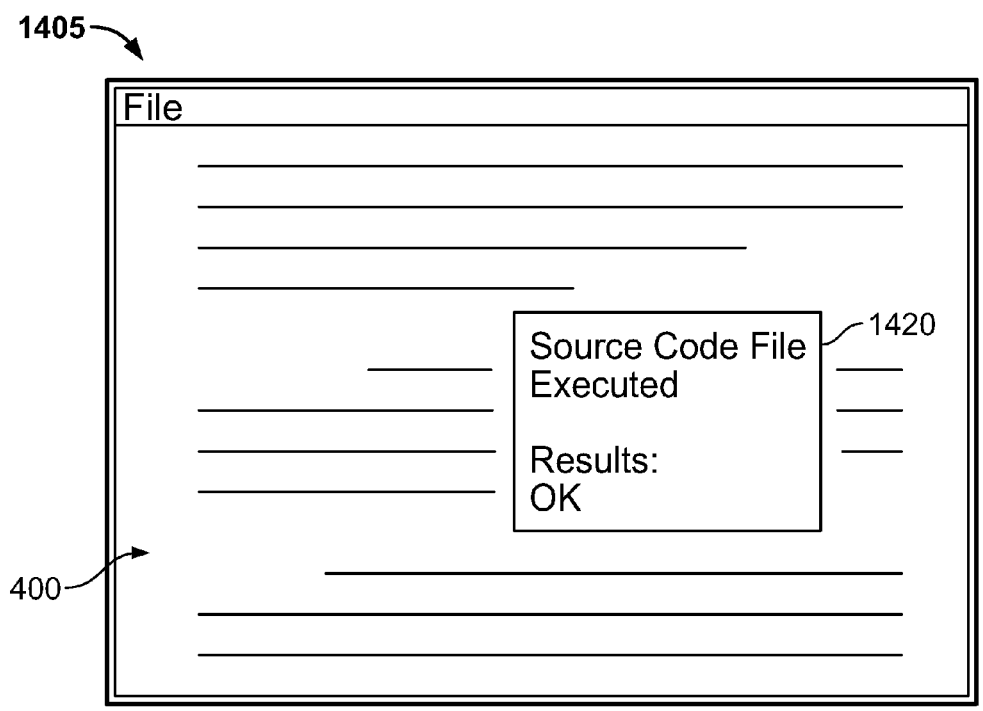
FIG. 14 shows a web page displaying a source code file and a results box in accordance with an embodiment.

In accordance with an embodiment, results of the execution of the source code file may be displayed on user device 160, as shown in FIG. 14. Web page 1405 displays source code file 400 and a results box 1420. In this example, results box 1420 indicates that source code file 400 was executed and displays the results ("OK").

In accordance with an embodiment, one or more developers may collaboratively edit a source code file and invoke another selected service that performs a selected activity with respect to the source code file. Because an updated version of the source code file is stored at versioned code storage 159, the selected service is performed quickly and substantially in real-time after the selection to invoke the service is made.

For example, in an embodiment, cloud-based hosting platform 155 may receive a request to compile a particular source code file. In response, processor 1108 causes compiler service 1110 to compile the source code file. The compiled code may be stored in versioned code storage 159.

In another embodiment, after compiling source code file 400, one or more developers may invoke test service 1146 to test the compiled code using test data or selected test conditions to observe the results.

In another embodiment, one or more developers may invoke code analysis service 1144 to examine a source code file and check the code against predetermined guidelines. For example, code analysis service 1144 may be invoked for the purpose of enforcing stylistic conventions or style rules established by a client. Code analysis service 1144 may also identify suspect code that may be an error.

Review Capability

Figure 15:
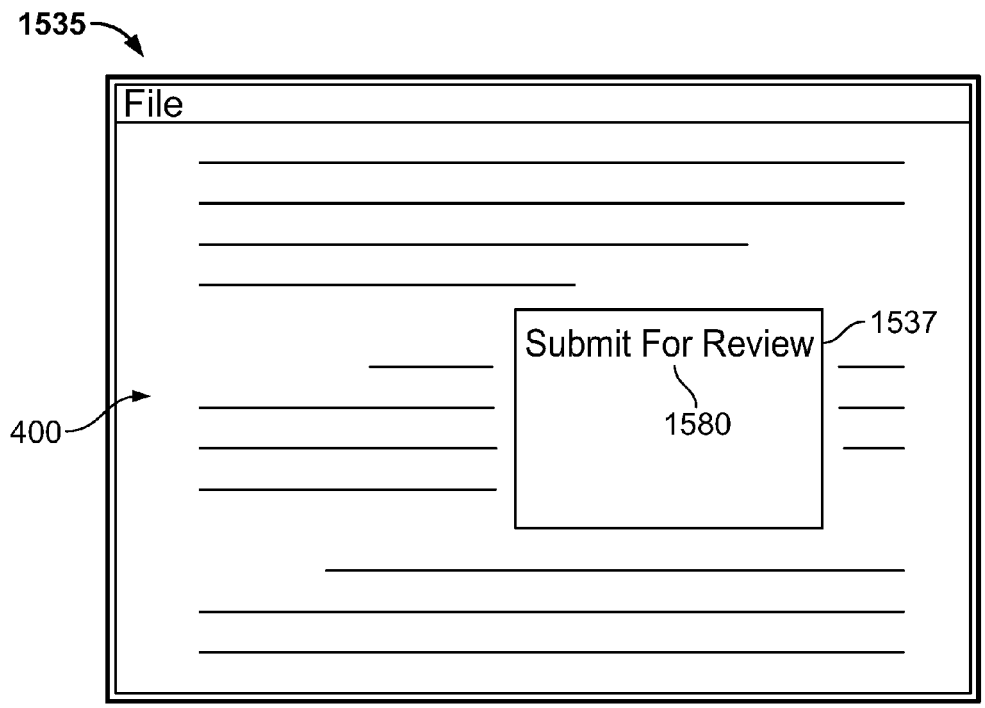
FIG. 15 shows a web page displaying a source code file and a menu with a submit for review option in accordance with an embodiment.

In accordance with an embodiment, a first developer may submit one or more source code files for review by a second developer. In another embodiment, a developer may submit for review a branch that includes a plurality of files. For example, when a source code file, or a branch (which may include one file or multiple files) is generated, a list specifying a senior developer responsible for the source code file and one or more junior developers who will collaborate in writing the source code, may be generated and stored in associated with the source code file. Subsequently, when a junior developer wishes to submit the source code file for review by the senior developer, the junior developer may do so by selecting a review option. FIG. 15 shows a web page 1535 displaying source code file 400 that may be displayed on user device 160 in accordance with an embodiment. A junior developer may cause a menu 1537 to appear, by clicking a button on a computer mouse, for example, and select a "submit for review" option 1580. User device 160 transmits the selection to collaborative development service 130; in response, collaborative development service 130 transmits a message to the senior developer indicating that the junior developer has requested that the senior developer review the source code file. For example, an email message containing a Uniform Resource Locator (URL) associated with the source code file may be sent to the senior developer.

The senior developer may then access the source code file, by clicking on the URL, for example, and review the source code. The senior developer may also execute the source code file by selecting an execute option similar to that shown in FIG. 13. When the senior developer chooses to execute the source code file, interpreter 1130 executes the source code file in the manner described above, and provides the results to the senior developer.

Branching Function

In accordance with an embodiment, a plurality of developers may generate respective copies, or "branches," of a source code file, edit their respective branches, and subsequently merge the various branches to generate a merged source code file. A single developer may create a branch and subsequently merge the branch with the original source code file. Alternatively, multiple developers may generate a plurality of branches and subsequently merge the various branches with the original source code file. As used herein, the term "branch" may refer to a single file derived from a source code file that includes a single file; or a branch may refer to a plurality of files derived from a source code file that includes a plurality of files.

Figure 16A:
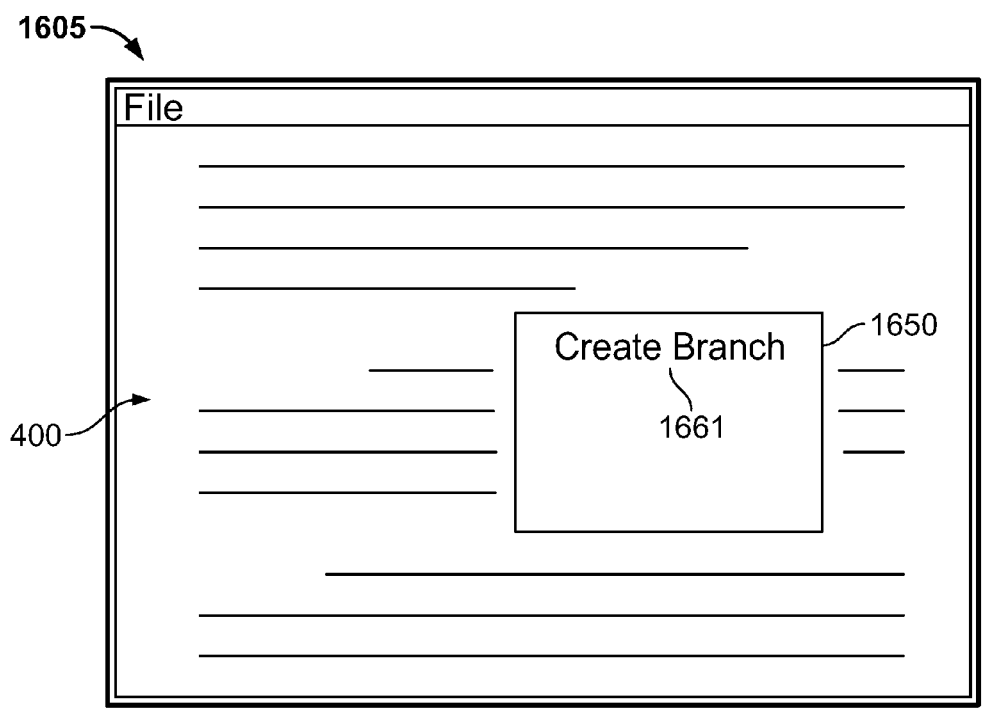
FIG. 16A shows a web page displaying a source code file and a menu with a create branch option in accordance with an embodiment.

Suppose, for example, that a first developer employing user device 160-A accesses source code file 400 and wishes to create a first "branch" of the source code file. While viewing source code file 400, the first developer may click on an appropriate button on a computer mouse, for example, to cause a menu 1650 to appear, as shown in FIG. 16A. Menu 1650 includes a "create branch" option 1661. When the first developer selects create branch option 1661, collaborative development service 130 generates a first copy of source code file 400 in response to the selection. Collaborative development service 130 stores the copy in memory 325 as branch-1 (1171), as shown in FIG. 3, and transmits a copy of branch 1 (1171) to versioned code storage 159, where it is stored, as shown in FIG. 11B. The first developer then makes several changes to branch-1 (1171).

In this discussion, source code file 400, from which branch-1 (1171) is derived, is sometimes referred to as the "trunk source code".

Now suppose that a second developer employing user device 160-B accesses source code file 400 and creates a second branch of the source code file, in a similar manner. Collaborative development service 130 generates a second copy of source code file 400, and stores the copy in memory 325 as branch-2 (1172), as shown in FIG. 3. Collaborative development service 130 also instructs versioned code storage 159 to create a second branch. Versioned code storage 159 therefore creates branch-2 (1172). Branch-2 (1172) is stored, as shown in FIG. 11B. The second developer then makes several changes to branch-2 (1172).

In accordance with an embodiment, a branch derived from a trunk source code file is maintained by storing only changes that are made relative to the trunk source code file.

In one embodiment, after one or more developers access a source code file and create two or more branches of the source code file, the developers may invoke conflict check service 1142 to check for conflicts between a branch and the trunk source code file and/or among the branches. In response, conflict check service 1142 accesses the respective branches of source code file and identifies conflicts between a branch and the trunk source code file and/or conflicts among the branches. If a conflict is found, conflict check service 1142 may notify the developers who created the respective branches.

As used herein, a "conflict" is a discrepancy that prevents a change in one branch from being merged automatically into another branch, or into the trunk source file.

In one embodiment, conflict check service 1142 may execute as a background routine while a developer edits a respective branch of a source code file. For example, in one embodiment, if conflict check service 1142 identifies a change in a first branch (such as branch-1 (1171)) made by a first developer that conflicts with the source code in the "trunk" source code file (source code file 400), conflict check service 1142 transmits a notification to the developer informing the developer of the potential conflict. For example, conflict check service 1142 may send a message indicating that if the developer merges the developer's branch with the trunk source code, there will be a conflict. In another embodiment, if conflict check service 1142 identifies a change in a first branch (e.g., branch-1 (1171)) made by a first developer that conflicts with the source code in a second developer's branch (e.g., branch-2 (1172)), conflict check service 1142 informs the first developer and also transmits a notification to the second developer informing the second developer of the conflict.

In another embodiment, conflict check service 1142 monitors the activities of various developers and determines a favorable time to merge a branch with the trunk source code file. For example, while a first developer is editing a branch derived from a trunk source code file, conflict check service 1142 may detect that a second developer has begun to make changes to the trunk source code file. As a result, conflict check service 1142 may inform the first developer that the first developer should merge the branch with the trunk source code file. In one embodiment, conflict check service 1142 notifies a developer of potential conflicts only when conflict check service 1142 notifies the developer that the developer should merge his or her branch with the trunk source code file.

Figure 16B:
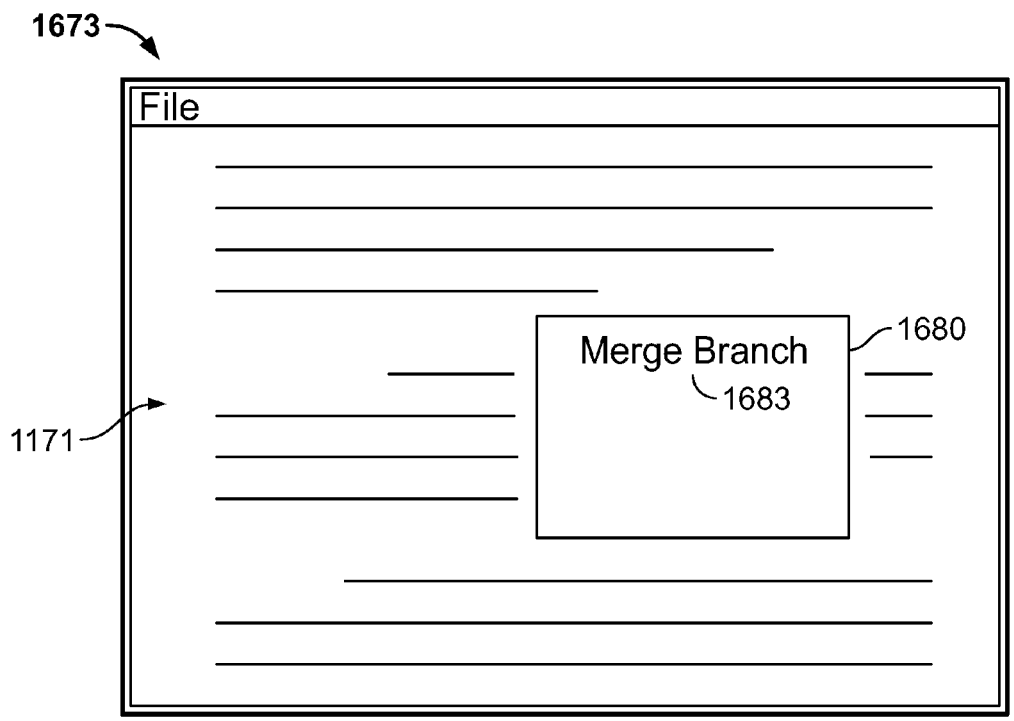
FIG. 16B shows a web page displaying a source code file and a menu with a merge branch option in accordance with an embodiment.

Now suppose that the first and second developers wish to merge their respective branches to generate a merged version of the source code file. In accordance with an embodiment, the first and/or second developer may select a merge option to reconcile and merge the first and second branches. While viewing branch-1 (1171), the first developer may click on an appropriate button on a computer mouse, for example, to cause a menu 1680 to appear, as shown in FIG. 16B. Menu 1680 includes a "merge branch" option 1683. When the first developer selects merge branch option 1683, user device 160-A transmits the selection to collaborative development service 130, which forward the selection to cloud-based hosting platform 155. Referring to FIG. 11A, merging service 1148 is invoked in response to the developer's selection.

Figure 16C:
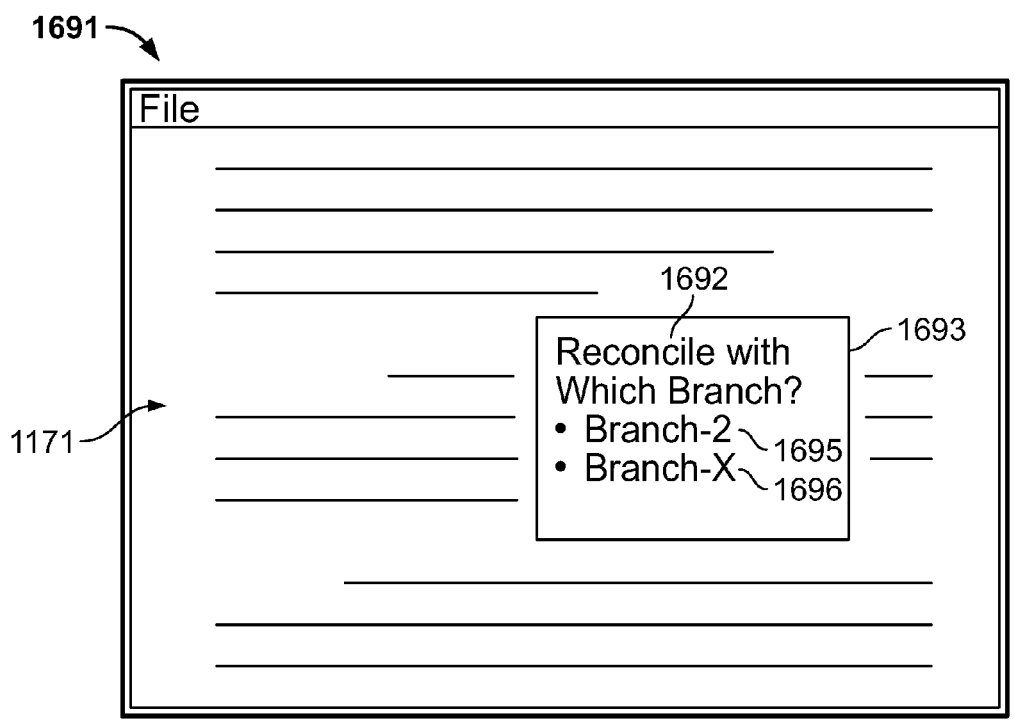
FIG. 16C shows a web page displaying a source code file and a menu with a reconcile option in accordance with an embodiment.

In one embodiment illustrated in FIG. 16C, a menu 1693 including a reconcile option 1692 may be displayed to the first developer. Specifically, reconcile option 1692 asks "Reconcile with which branch?" and provides a first option 1695 (Branch-2) and a second option 1696 (Branch-X). An option to reconcile with the trunk source code file may also be provided. In the illustrative embodiment, the first developer selects first option 1695 (Branch-2).

In response, merging service 1148 examines branch-1 (1171) and branch-2 (1172) and determines if there are any conflicts between the two branches. Merging service 1148 may invoke conflict check service 1142 to perform this function. If conflicts are identified, the developers are notified and may be required to resolve the conflicts, by further editing one or more of the branches, for example. After conflicts are resolved, merging service 1148 combines the two branches to generate a unified source code file. In one embodiment, changes to a branch that do not create a conflict are incorporated into the unified source code file without modification.

In another embodiment, a developer selects an option to merge a branch with the trunk source code file. In response, merging service 1148 examines the branch, determines whether any conflicts exist between the branch and the trunk source code file, and merges the branch file with the trunk source code file.

In one embodiment, source code files, branches, and other data may be multi-homed. For example, source code files, branches, and other data may be replicated across multiple data centers.

Figure 16D:
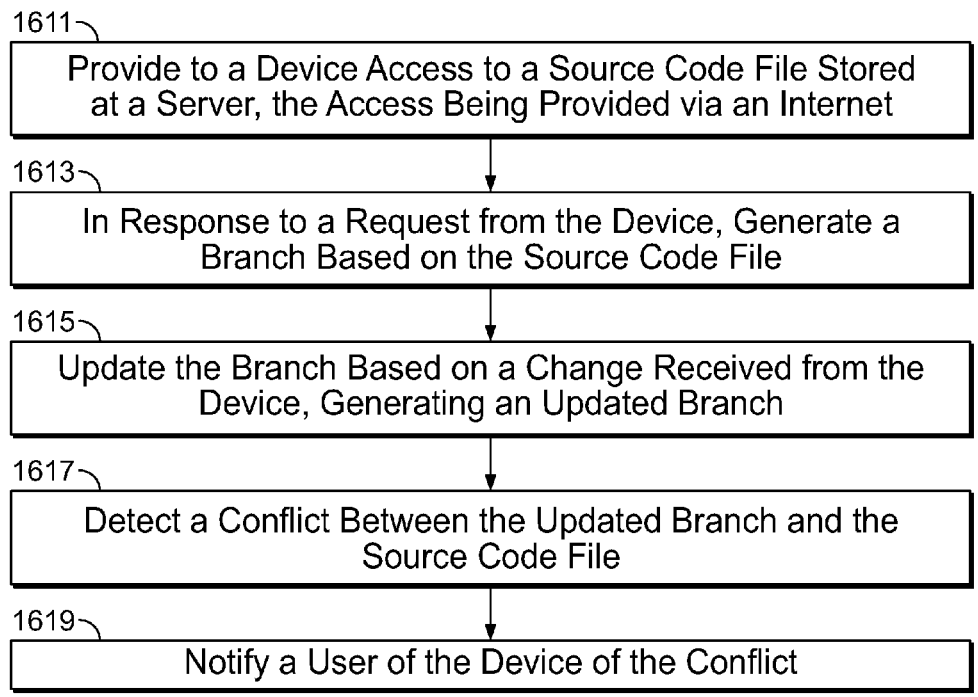
FIG. 16D is a flowchart of a method of providing collaborative software development services in accordance with an embodiment.

FIG. 16D is a flowchart of a method of providing collaborative software development services in accordance with an embodiment. At step 1611, access to a source code file stored at a server is provided to a device, the access being provided via an Internet. For example, collaborative development service 130 may enable one or more users to access the version of source code file 400 stored in versioned code storage 159. In another embodiment, cloud-based hosting platform 155 provides access to a source code file stored in versioned code storage 159. At step 1613, in response to a request from the device, a branch is generated based on the source code file. In the manner described above, the user may request that a branch of source code file 400 be generated. In response, collaborative development service 130 may cause branch (such as branch 1171) to be generated and stored in versioned code storage 159. In another embodiment, cloud-based hosting platform 155 may cause a branch to be generated in response to the request. At step 1615, the branch is updated based on a change received from the device, generating an updated branch. The user may edit branch 1171, and an updated branch file is generated based on the user's change(s), and is stored in versioned code storage 159. At step 1617, a conflict is detected between the updated branch and the source code file. For example, conflict check service 1142 may examine branch 1171 and source code file 400 and identify a conflict. At step 1619, a user of the device is notified of the conflict. Conflict check service 1142 informs the user of the conflict, in the manner described above.

In another embodiment, a user generates and edits a branch based on a source code file, in the manner described above, and requests that a second user review the branch. A review request is transmitted to the second user, in the manner described above. The second user reviews the branch in response to the review request, and submits a request to execute the branch. In response to the request from the second user to execute the branch, the branch is executed. After the branch is reviewed, the branch may be merged with the source code file.

In various embodiments, the method steps described herein, including the method steps described in FIG. 6 and/or FIG. 12, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 6 and/or FIG. 12. Certain steps of the methods described herein, including one or more of the steps of FIG. 6 and/or FIG. 12, may be performed by a server or by another processor in a network-based cloud-computing system. Certain steps of the methods described herein, including one or more of the steps of FIG. 6 and/or FIG. 12, may be performed by a client computer in a network-based cloud computing system. The steps of the methods described herein, including one or more of the steps of FIG. 6 and/or FIG. 12, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 6 and/or FIG. 12, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 17:
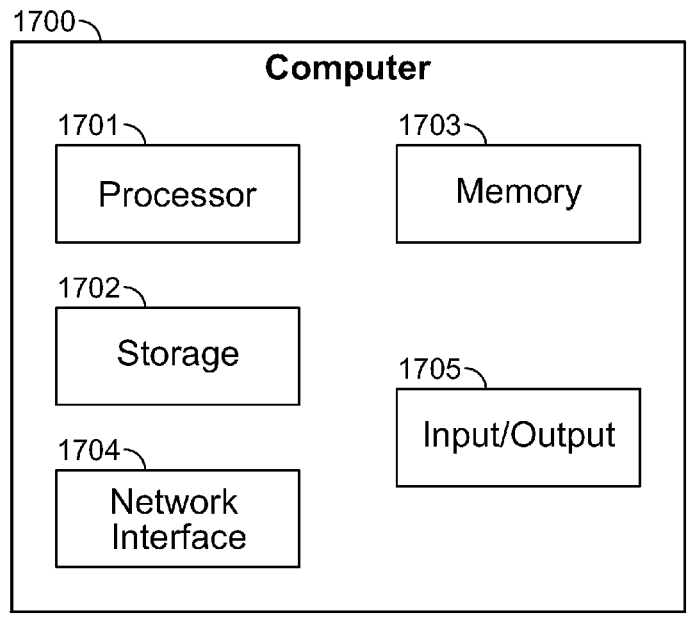
FIG. 17 shows components of a computer that may be used to implement the invention.

A high-level block diagram of an exemplary computer that may be used to implement systems, apparatus and methods described herein is illustrated in FIG. 17. Computer 1700 includes a processor 1701 operatively coupled to a data storage device 1702 and a memory 1703. Processor 1701 controls the overall operation of computer 1700 by executing computer program instructions that define such operations. The computer program instructions may be stored in data storage device 1702, or other computer readable medium, and loaded into memory 1703 when execution of the computer program instructions is desired. Thus, the method steps of FIG. 6 and/or FIG. 12 can be defined by the computer program instructions stored in memory 1703 and/or data storage device 1702 and controlled by the processor 1701 executing the computer program instructions. For example, the computer program instructions can be implemented as computer executable code programmed by one skilled in the art to perform an algorithm defined by the method steps of FIG. 6 and/or FIG. 12. Accordingly, by executing the computer program instructions, the processor 1701 executes an algorithm defined by the method steps of FIG. 6 and/or FIG. 12. Computer 1700 also includes one or more network interfaces 1704 for communicating with other devices via a network. Computer 1700 also includes one or more input/output devices 1705 that enable user interaction with computer 1700 (e.g., display, keyboard, mouse, speakers, buttons, etc.).

Processor 1701 may include both general and special purpose microprocessors, and may be the sole processor or one of multiple processors of computer 1700. Processor 1701 may include one or more central processing units (CPUs), for example. Processor 1701, data storage device 1702, and/or memory 1703 may include, be supplemented by, or incorporated in, one or more application-specific integrated circuits (ASICs) and/or one or more field programmable gate lists (FPGAs).

Data storage device 1702 and memory 1703 each include a tangible non-transitory computer readable storage medium. Data storage device 1702, and memory 1703, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1705 may include peripherals, such as a printer, scanner, display screen, etc. For example, input/output devices 1705 may include a display device such as a cathode ray tube (CRT) or liquid crystal display (LCD) monitor for displaying information to the user, a keyboard, and a pointing device such as a mouse or a trackball by which the user can provide input to computer 1700.

Any or all of the systems and apparatus discussed herein, including collaborative development service 130, user device 160, and components thereof, including web browser 210, display 270, operational transformation rules 333, processor 375, and memory 325, may be implemented using a computer such as computer 1700.

One skilled in the art will recognize that an implementation of an actual computer or computer system may have other structures and may contain other components as well, and that FIG. 16 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of providing software development services, the method comprising:
    providing, by one or more processors, to a plurality of user devices, access to a source code file via a network;
    updating, by the one or more processors, the source code file based on a plurality of changes received via the network from one or more of the plurality user devices, wherein updating the source code file comprises identifying a plurality of updates to the source code file;
    determining, for each of the plurality of user devices, by the one or more processors, a local portion of the source code file stored by each respective user device, the local portion being less than all of the source code file and each respective user device storing only a local portion of the source code file; and
    for each update within the plurality of updates:
        determining, by the one or more processors, whether the update corresponds to any of the local portion of the source code file stored by the plurality of user devices;
        transmitting, by the one or more processors, the update to a respective user device when the respective update corresponds to the local portion of the source code file stored by the respective user device.
2. The method of claim 1, wherein: the source code file comprises a plurality of files.

3. The method of claim 1, further comprising:
    providing, to the plurality of user devices, substantially simultaneous access to the source code file stored at a server, via the network.
4. The method of claim 1, further comprising:
    receiving, from one of the plurality of user devices, a request to perform a service with respect to the source code file; and
    in response to the request, performing the service with respect to the source code file, substantially in real-time.
5. The method of claim 4, wherein the service comprises one of a compiler service and a code analysis service.
6. The method of claim 1, further comprising:
    modifying the source code file based on a change received from a first user device, generating a modified source code file;
    receiving from the first user device, a second request that a particular user review the modified source code file;
    in response to the second request, transmitting a review request to the particular user;
    receiving from the particular user a second selection of an option to execute the modified source code file; and
    in response to the second selection, executing the modified source code file, substantially in real-time.
7. The method of claim 1, further comprising:
    receiving, from a first user device, a request to generate a branch of the source code file;
    in response to the request, generating a branch of the source code file;
    modifying the branch based on a change received from the first user device;
    receiving, from the first user device, a second request that a particular user review the branch;
    in response to the second request, transmitting a review request to the particular user;
    receiving from the particular user a second selection of a second option to execute the branch; and
    in response to the second selection, executing the branch, substantially in real-time.
8. The method of claim 1, wherein the source code file comprises software code, the method further comprising:
    allowing a plurality of users employing the plurality of user devices to collaboratively edit the software code.
9. The method of claim 1, wherein the local portion includes one or more portions of the source code file.
10. A non-transitory computer-readable medium having stored thereon instructions which, when executed by one or more processors, cause the one or more processors to perform a method of providing software development services, the method comprising:
    providing, to a plurality of user devices, access to a source code file via a network;
    updating the source code file based on a plurality of changes received via the network from one or more of the plurality of user devices, wherein updating the source code file includes identifying a plurality of updates to the source code file;
    determining for each of the plurality of user devices, a local portion of the source code file stored by each respective user device, the local portion being less than all of the source code file and each respective user device storing only a local portion of the source code file; and
    for each update within the plurality of updates;

determining whether the update corresponds to any of the local portions of the source code file stored by the plurality of user devices;

transmitting the update to a respective user device when the respective update corresponds to the local portion of the source code file stored by the respective user device.

11. The non-transitory computer readable medium of claim 10, wherein:

the source code file comprises a plurality of files.

12. The non-transitory computer readable medium of claim 10, further comprising program instructions defining the step of:

providing, to a plurality of user devices, substantially simultaneous access to the source code file stored at a server, via the network.

13. The non-transitory computer readable medium of claim 10, further comprising program instructions defining the steps of:

receiving, from one of the plurality of user devices, a request to perform a service with respect to the source code file; and in response to the request, performing the service with respect to the source code file, substantially in real-time.

14. The non-transitory computer readable medium of claim 13, wherein the service comprises one of a compiler service and a code analysis service.

15. The non-transitory computer readable medium of claim 10, further comprising program instructions defining the steps of:

modifying the source code file based on a change received from a first user device, generating a modified source code file;

receiving, from the first user device, a second request that a particular user review the modified source code file;

in response to the second request, transmitting a review request to the particular user;

receiving from the particular user a second selection of an option to execute the modified source code file; and in response to the second selection, executing the modified source code file, substantially in real-time.

16. The non-transitory computer readable medium of claim 10, further comprising program instructions defining the steps of:

receiving, from a first user device, a request to generate a branch of the source code file;

in response to the request, generating a branch of the source code file;

modifying the branch based on a change received from the first user device;

receiving, from the first user device, a second request that a particular user review the branch;

in response to the second request, transmitting a review request to the particular user;

receiving from the particular user a second selection of a second option to execute the branch; and in response to the second selection, executing the branch, substantially in real-time.

17. The non-transitory computer readable medium of claim 10, wherein the source code file comprises software code, the non-transitory computer readable medium further comprising program instructions defining the step of:

allowing a plurality of users employing the plurality of user devices to collaboratively edit the software code.

18. The non-transitory computer readable medium of claim 10, wherein the local portion includes one or more portions of the source code file.

19. A method of providing software development services, the method comprising:

providing, by one or more processors, to a plurality of user devices, access to a source code file via a network;

updating, by the one or more processors, the source code file based on a plurality of changes received from respective user devices, said updating including, applying one or more operational transformation rules to the respective changes; and generating a plurality of modifications applicable to the source code file based on the applied operational transform rules;

determining, by the one or more processors, for each of the plurality of user devices, a subset of modifications applicable to respective portions of the source code file stored in each respective user devices, the respective portions being less than the source code file; and transmitting by the one or more processors, the determined subset of applicable modifications to only those respective user devices that store the respective portions.

* * * * *